United States Patent [19]
Watari et al.

[11] Patent Number: 5,003,601
[45] Date of Patent: Mar. 26, 1991

[54] SPEECH RECOGNITION METHOD AND APPARATUS THEREOF

[75] Inventors: Masao Watari, Saitama; Yoichiro Sako, Tokyo; Makoto Akabane, Saitama; Atsunobu Hiraiwa, Kanagawa, all of Japan

[73] Assignee: Sony Corporation, Tokyo, Japan

[21] Appl. No.: 323,098

[22] Filed: Mar. 7, 1989

Related U.S. Application Data

[63] Continuation of Ser. No. 735,185, May 17, 1985, abandoned.

[30] Foreign Application Priority Data

May 25, 1984 [JP] Japan ................................ 59-106177
May 29, 1984 [JP] Japan ................................ 59-109172
Jun. 15, 1984 [JP] Japan ................................ 59-123443
Jun. 25, 1984 [JP] Japan ................................ 59-130714

[51] Int. Cl.$^5$ ............................................. G10L 5/00
[52] U.S. Cl. .................................................... 381/43
[58] Field of Search .................... 381/41, 43; 364/513.5

[56] References Cited

U.S. PATENT DOCUMENTS

| | | | |
|---|---|---|---|
| 4,049,913 | 9/1977 | Sakoe | 179/1 SD |
| 4,059,725 | 11/1977 | Sakoe | 179/1 SD |
| 4,256,924 | 3/1981 | Sakoe | 179/1 SD |
| 4,348,553 | 9/1982 | Baker et al. | 179/1 SB |
| 4,384,273 | 5/1983 | Ackland et al. | 384/34 |
| 4,467,437 | 8/1984 | Tsuruta et al. | 364/513.5 |

FOREIGN PATENT DOCUMENTS 2448908  4/1986  Fed. Rep. of Germany .
  96104  7/1975  Japan .

OTHER PUBLICATIONS

"Real-Time Recognition of Spoken Words", Louis C. W. Pols, IEEE, vol. c-20, No. 9, Sep. 1971, pp. 972-978.
European Search Report-Appln. No.: EP 85 30 3666, date of search: 12-8-85.

Primary Examiner—Emanuel S. Kemeny
Attorney, Agent, or Firm—Lewis H. Eslinger; Jay H. Maioli

[57] ABSTRACT

A speech recognition method and apparatus in which a plurality of time-sequential acoustic parameters are derived from a segmented input speech signal and are used to form a first trajectory that is time normalized. The time-normalized trajectory is sampled at predetermined lengths therealong and the sampling results used to form a new time-normalized trajectory with equally spaced points ("dots" on the graph), which is compared with a plurality of previously registered trajectories until a match is found between the new time-normalized trajectory and one of the registered trajectories, at which time an indication of the results of the matching is produced. A silence acoustic parameter can also be added to the time-sequential acoustic parameters so that the time-normalized trajectory can start and end from a point of silence. In addition, the length of the first trajectory formed from the acoustic parameters derived from the segmented speech signals is determined and used in the matching operation with the registered trajectories, so that the lengths of the trajectories as well as the distances between the formed trajectory and the stored trajectory are also taken into account to increase the recognition ratio.

22 Claims, 8 Drawing Sheets

SPEECH RECOGNITION METHOD AND APPARATUS THEREOF

This is a continuation of application Ser. No. 06/735,185, filed 5-17-85 now abandoned.

BACKGROUND OF THE INVENTION

1. Field of the Invention

This invention relates generally to a method and apparatus for speech recognition and, more particularly, to a speech recognition system in which input speech signals are matched with already registered signals to obtain speech recognition.

2. Description of the Background

There have been proposed speech recognition systems having countermeasures against fluctuations in the utterance speed of speech that use the so-called dynamic programming (DP) processing. Such a system is disclosed, for example, in published Japanese patent application No. 96104/1975. According to such known speech recognition apparatus using the dynamic programming matching processing, speech recognition can be carried out by matching input speech signals against stored templates without problems of utterance speed fluctuation and differences in word lengths, because the time dimension of the input is optimally warped, that is, time-normalization is performed.

In such speech recognition apparatus using dynamic programming matching processing to accomplish time-normalization, when the number of words to be recognized is increased, there is the further problem that the calculation time and memory capacity necessary for dynamic matching programming processing are inevitably and unfortunately increased.

OBJECTS AND SUMMARY OF THE INVENTION

Accordingly, it is an object of the present invention to provide a speech recognition method and apparatus in which an input speech signal is time-normalized, and this time-normalized input speech signal is matched with a previously registered speech signal in such a manner so as to decrease the calculation time and memory capacity necessary for the matching processing.

Another object of the present invention is to provide a speech recognition method and apparatus in which before a segmented input speech signal is matched with a registered speech signal, the segmented input speech signal is time-normalized, thereby raising the recognition ratio.

Still another object of the present invention is to provide a speech recognition method and apparatus in which a plurality of time-sequential acoustic parameters are produced from a segmented input speech signal and on the basis of data points (dots) formed in the parameter space by acoustic parameters at every sampling time of the time-sequential acoustic parameters, a trajectory of the segmented speech signal is produced to time-normalize the segmented input speech signal.

A further object of the present invention is to provide a speech recognition method and apparatus in which a silence acoustic parameter is added to a time-sequential acoustic parameter produced from a segmented speech signal, and its trajectory is produced on the basis of data points (dots) formed in the parameter space by the time-sequential acoustic parameters to increase the speech recognition ratio.

A still further object of the present invention is to provide a speech recognition method and apparatus in which before a trajectory produced from segmented speech signals and a registered standard trajectory are matched with each other based on the trajectory length of the segmented speech signal, the number of registered standard trajectories needed for the matching processing is limited, thereby increasing the speech recognition ratio and decreasing the time necessary for speech recognition.

Yet another object of the present invention is to provide a speech recognition method and apparatus in which when a trajectory obtained from a segmented speech signal and a registered standard trajectory are matched with each other, the length of the trajectory obtained from the segmented speech signal and the length of the registered standard trajectory are respectively compared and used as data for the matching processing, thereby increasing the speech recognition ratio.

In accordance with an aspect of the present invention, a speech recognition method comprises the steps of: segmenting an input speech signal; producing a plurality of time-sequential acoustic parameters from a segmented speech signal; producing a trajectory on the basis of dots, each corresponding to a data point of the time-sequential acoustic parameters, thereby to time-normalize the segmented speech signal; matching the time-normalized trajectory with one of a plurality of registered standard time-normalized trajectories; and producing a matching result.

In accordance with another aspect of the present invention, a speech recognition apparatus comprises:

a speech signal segmenting circuit; a circuit for producing a plurality of time-sequential acoustic parameters from the segmented speech signal; first calculating circuit for calculating a length between acoustic parameters produced at a sampling time and acoustic parameters at the adjacent sampling times; a second calculating circuit for calculating time-sequential speech recognition parameters by sampling a series of the calculated lengths at predetermined lengths therealong; a matching circuit for matching the time-sequential speech recognition parameters with the standard time-sequential parameters; and an output circuit for producing a matching result indicating speech recognition.

The above and other objects, features, and advantages of the speech recognition method and apparatus according to the present invention will become apparent from the following detailed description of preferred embodiments taken in conjunction with the accompanying drawings, throughout which like reference numerals designate like elements and parts.

DETAILED DESCRIPTION OF PREFERRED EMBODIMENTS

In the present invention, an input speech signal is segmented and a plurality of time-sequential acoustic parameters are produced from the segmented speech signals. Then, on the basis of data points, hereinafter referred to as dots, in a parameter space defined by the time-sequential acoustic parameters at each sampling time, a trajectory thereof is obtained for use in performing the speech recognition operation. In the present invention, the term "speech recognition" is used not only to indicate specifying the speech content uttered but also to indicate specifying the identity of the speaker.

Figure 1:
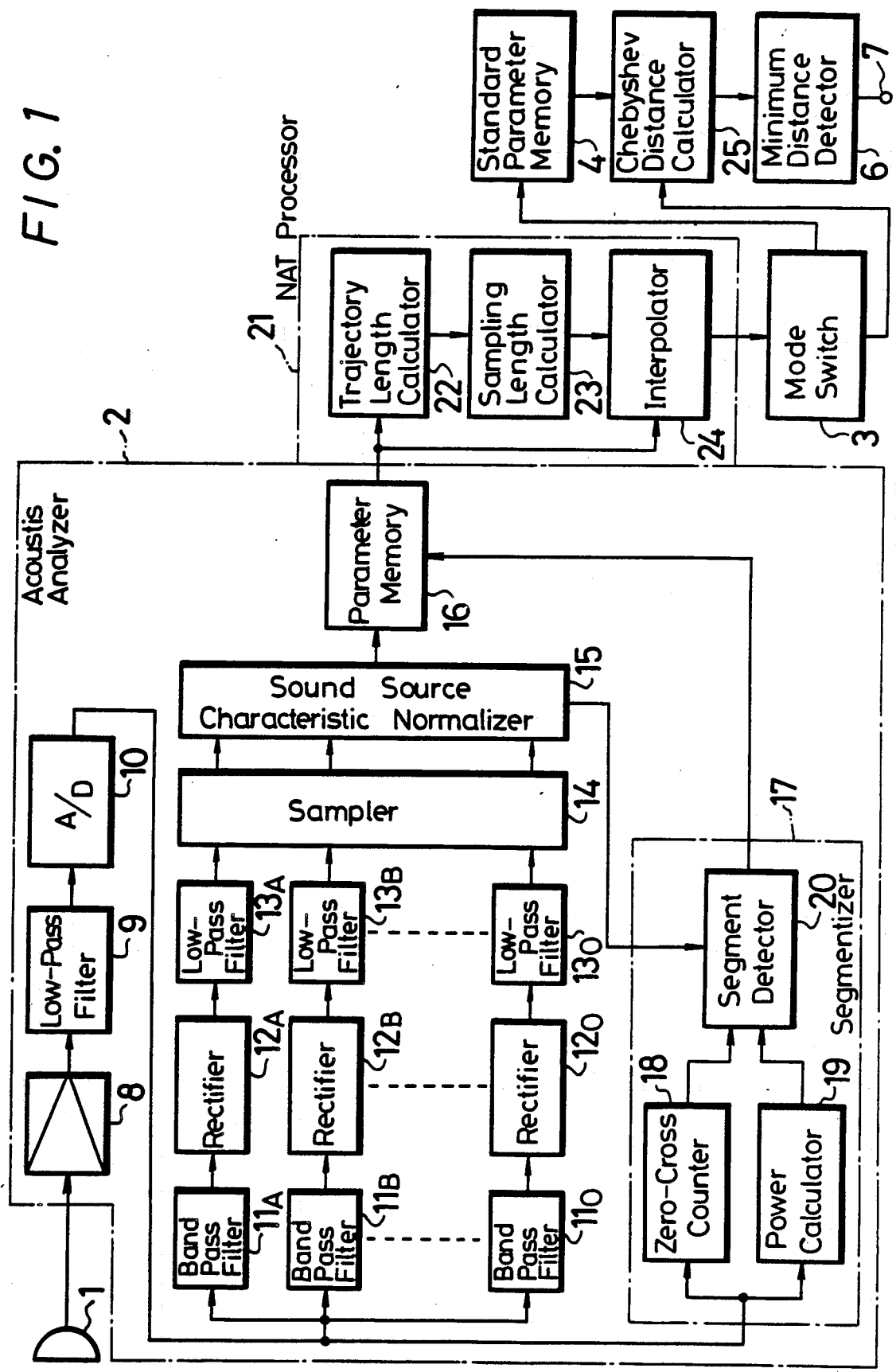
FIG. 1 is a schematic in block diagram form of speech recognition apparatus according to an embodiment of the present invention.

In FIG. 1, a microphone 1 supplies a speech signal to an amplifier 8 of an acoustic analyzer 2. The speech signal after having been amplified by amplifier 8 is supplied through a low-pass filter 9, having a cut-off frequency of 5.5 KHz, to a 12-bit analog-to-digital (A/D) converter 10, which has a sampling frequency of 12.5 KHz. The digital speech signal from A/D converter 10 is supplied to a bank of digital bandpass filters 11A, 11B, . . . 110 forming, for example, fifteen channels, all of which are connected in parallel. Each of the fifteen digital bandpass filters 11A, 11B . . . 110 is formed as a quaternary-digital filter, for example, a fourth-order Butterworth filter, and the passband of each individual filter is assigned such that the frequency bands from 250 Hz to 5.5 KHz are provided so as to have equal intervals on a logarithmic scale. The output signals from digital bandpass filters 11A, 11B, . . . , 110 are respectively supplied to rectifiers 12A, 12B . . . , 120 in the fifteen channels, and the rectified outputs from rectifiers 12A, 12B, . . . , 120 are respectively supplied to low-pass filters 13A, 13B . . . , 130 in each of the fifteen channels. One example of digital low-pass filters 13A, 13B, . . . , 130 is a finite impulse response (FIR) type low-pass filter having a cut-off frequency of 52.8 Hz.

The fifteen output signals of low-pass filters 13A, 13B, . . . 130 are respectively supplied to a sampler circuit 14 having a sampling period of 5.12 milliseconds. By use of sampler 14, the output signals from low-pass filters 13A, 13B, . . . , 130 are sampled with a sampling period of 5.12 ms. The sampled output signals from sampler 14 are supplied to a sound source characteristic normalizer 15 that removes or normalizes differences in the speech characteristics by the speakers. If it is desired only to identify a particular speaker and not to determine the speech content, sound source characteristic normalizer 15 can be omitted.

In sound source characteristic normalizer 15, the sampling signal Ai(n) (i = 1, . . . R; where i is the serial number of the bandpass filters for acoustic analysis and n is the sampling time) is subjected to a logarithmic transformation expressed as:

$$A'i(n) = \log(Ai(n) \times B) \quad (1)$$

In equation (1), B is a bias level that is set to hide noise contained in the input speech signal. Then, a vocal source characteristic is approximated by an equation of $yi = a \cdot i \times b$, and the values a and b are respectively determined by the following equations.

$$a(n) = \frac{6\left(2 \sum_{i=1}^{R} i \cdot A'i(n) - (R+1) \sum_{i=1}^{R} A'i(n)\right)}{R(R+1)(R-1)} \quad (2)$$

$$b(n) = \frac{2\left((2R+1) \sum_{i=1}^{R} i \cdot A'i(n) - 3 \sum_{i=1}^{R} i \cdot A'i(n)\right)}{R(R-1)} \quad (3)$$

where R is fifteen in this embodiment.

If the normalized parameter of the sound or vocal source is taken as Pi(n), when a(n) > 0 is established, then parameter Pi(n) is expressed as:

$$Pi(n) = A'i(n) - \{a(n) \cdot i \times b(n)\} \quad (4)$$

Further, when a(n) > 0 is established, only the level of the input speech signal is normalized and, thus, parameter Pi(n) is expressed as:

$$Pi(n) = A'i(n) - \sum_{i=1}^{R} A'i(n)/R \quad (5)$$

Parameter Pi(n) whose vocal source characteristic is normalized by such processing is supplied to a parameter memory 16, in which there is stored at every speech interval a vocal source characteristic-normalized parameter Pi(n) by a segment detecting signal produced from a vocal period detecting section or segmentizer 17.

The digital speech signal from A/D converter 10 is supplied to a zero-cross counter 18 and to a power calculator 19 that form part of segmentizer 17. Zero-cross counter 18 counts the number of zero-crosses of the digital speech signals at 64 points every 5.12 ms and supplies the counted value to a vocal period segment detector 20. Power calculator 19 calculates the power, or a squared sum, of the digital speech signals every 5.12 ms interval and supplies a power signal indicative of the power within that interval to vocal period segment detector 20. The vocal source characteristic-normalized data a(n) and b(n) obtained from source characteristic normalizer 15 are both supplied to segment detector 20, wherein on the basis of the zero-cross number, the interval power, and the source characteristic-normalized data a(n) and b(n), the discriminating processing for discriminating silence, unvoiced sound, and voice sounds, is carried out to determine the speech interval or segment. In this case, the speech interval or segment may be determined in units of phonemes, words, and sentences. The speech segment detecting signal indicative of the segmented speech from the segment detector 20 is supplied to the parameter memory 16 as the output of the segmentizer 17.

The acoustic analyzing technique for an input speech signal in acoustic analyzer 2 is not limited to this embodiment using bandpass filters, but can comprise any technique, so long as it can extract the necessary characteristics of the input speech signal.

The acoustic parameter Pi(n), whose source characteristic is normalized at every speech segment stored in parameter memory 16, is supplied to a normalization-along-trajectory (NAT) processor 21. NAT processor 21 is adapted to produce a trajectory from the time-sequential acoustic parameter Pi(n) in the parameter space thereof.

Figure 2:
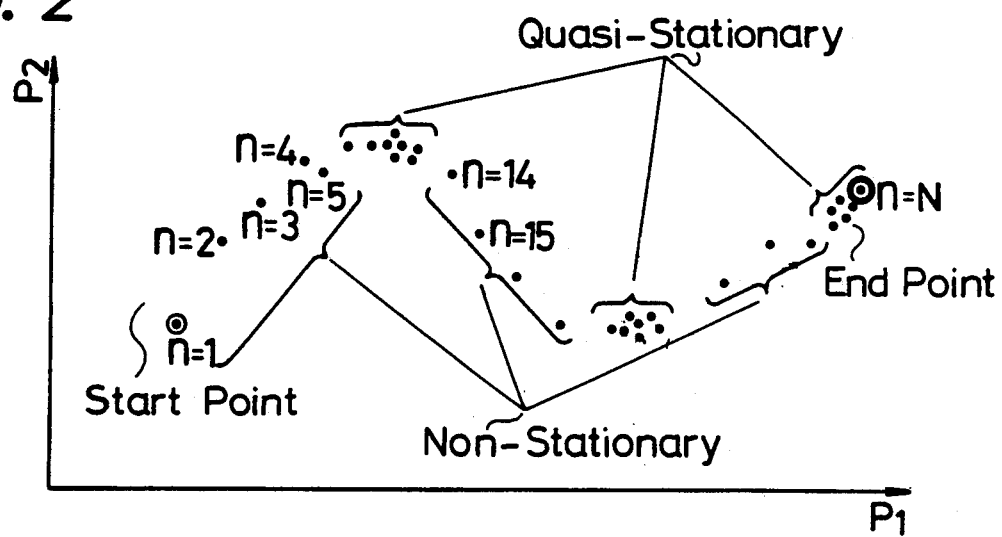
FIG. 2 is a graph showing dots drawn by time-sequential acoustic parameters obtained from segmented input speech signals in a two-dimensional parameter space.

In NAT processor 21, the time-sequential acoustic parameter Pi(n) (i=1, ... I;n=1, ... N where n is the sampling time) draws dots in a parameter space of the I-th dimension at every sampling time. In FIG. 2 an example of dots distributed in the two-dimensional parameter space is presented for convenience of explanation, however, in practice these dots become the dots in the parameter space formed of the frequency-analyzed number that is used to frequency-analyze the input speech signal in acoustic analyzer 2. In FIG. 2 the dots in the nonstationary portions of the input speech signal are widely distributed, while the dots in the quasi-stationary portions of the input speech signal are less widely distributed. From FIG. 2 it is easily seen that in the stationary portions of the input speech signal, the acoustic parameters do not change and the dots stay generally at one location in the parameter space.

Figure 3:
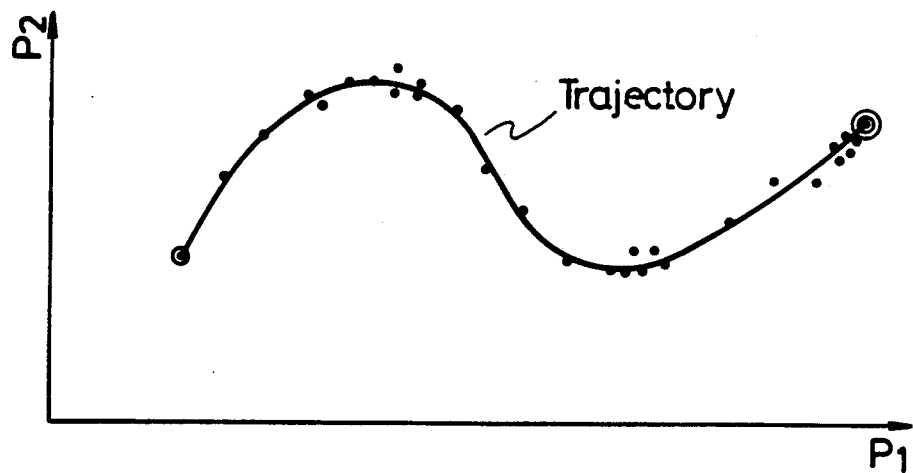
FIG. 3 is a graphical representation of a time-normalized trajectory of the segmented speech signals based on the dots shown in FIG. 2.

FIG. 3 is an example of a trajectory formed by connecting the dots of FIG. 2 by a smooth curve If a trajectory such as shown in FIG. 3 can be obtained, then speech utterance speed fluctuations can be removed. This is because it can be considered that time length differences of the segmented speech signals due to speech utterance speed fluctuations are almost all caused by time-length expansion and contraction of the quasi-stationary portion This is equivalent to the dot density of the quasi-stationary portions in the case of the dots shown in FIG. 2. Thus, the influence of the time length on the non-stationary portion is relatively small. NAT processor 21 of FIG. 1 then performs time normalization, in view of the fact that the trajectory is not changed relative to such speech utterance speed fluctuations. In other words, from the time-sequential acoustic parameter Pi(n) represented in FIG. 2, the trajectory of FIG. 3 is obtained, which is formed by the smooth continuous curve beginning at start point Pi(1) to end point Pi(n). If the curved line indicative of this trajectory is expressed as Pi(s) (0≦s≦S), it is not always necessary that Pi(0)=Pi(1) and Pi(S)=Pi(N) be established and, basically, the curved line may be such that Pi(s) will pass approximately through all of the dots. By matching the shape of the trajectory drawn by the segmented speech signals thus obtained, or the trajectory length with the previously registered standard trajectory or trajectory length, it then becomes possible to carry out speech recognition.

Figure 4:
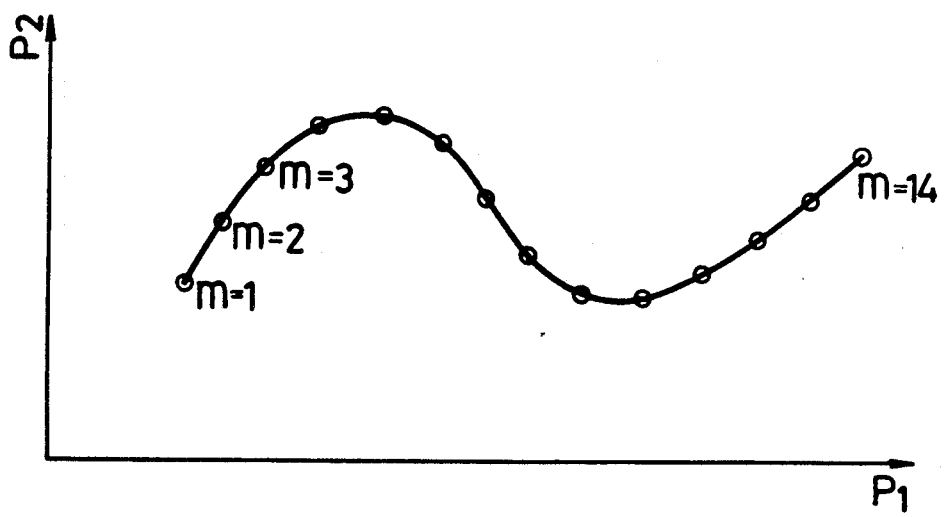
FIG. 4 is a graphical representation indicating that in matching the segmented input speech signal with a registered speech signal, the trajectory drawn from the segmented speech signal of FIG. 3 is to be sampled at predetermined lengths along the trajectory.

As a practical example, the trajectory of the segmented speech signals is obtained by using straight or curved lines to interpolate the dots drawn by a plurality of time-sequential acoustic parameters produced from the segmented speech signals in the parameter space at every sampling point. Alternatively, the trajectory is assumed on the basis of more than two dots drawn by a plurality of the time-sequential acoustic parameters. The length SL of this trajectory is obtained and, as shown by the circles in FIG. 4, new dots are sampled at predetermined lengths along the trajectory. If, for example, M dots are sampled, dots on the trajectory are sampled on the basis of a predetermined length, that is, the sampling interval T=SL/(M−1)/ If a series of sampled dots are taken as Qi(m) (i=1, ... , I;m=1, ... , M), then Qi(1)=Pi(o) and Qi(M)=Pi(S) are established.

The new time-sequential acoustic parameter Qi(m) thus obtained is time-normalized and is used as a time-sequential speech recognition parameter suitable for use in the matching processing. When the sampling number M is fixed, even if the length of the trajectory formed by the segmented speech signals changes, the sampling number of the time-sequential speech recognition parameters will be constant, so that the above-described sampling number can coincide with that of the previously registered standard trajectory, making the matching processing easy.

In a second practical example, the sampling interval carried out along the trajectory to obtain the new dots in the first example is kept constant, regardless of the length of the trajectory. The new time-sequential acoustic parameter obtained in this sampling is used as the speech recognition parameter, in which case because the trajectory drawn by the segmented speech signals is always sampled with a predetermined length regardless of the trajectory length, the length of the trajectory drawn by the segmented speech signals can be used as data for the matching processing.

The above-described first example can be explained more fully with reference to FIG. 1, wherein a trajectory length calculator 22 in NAT processor 21 calculates the length of the trajectory drawn in the parameter space by the time-sequential acoustic parameter Pi(n), or the trajectory length. In general, the Euclidean distance $D(a_i, b_i)$ between I-th dimensional vectors $a_i$ and $b_i$ is expressed as:

$$D(a_i, b_i) = \sqrt{\sum_{i=1}^{I} (a_i - b_i)^2} \tag{6}$$

Accordingly, a distance S(n) between the adjacent parameters in the case where the trajectory is obtained from the I-th dimension, which is equal to the frequency-analyzing number for frequency-analyzing the input speech signal in acoustic analyzer 2, time-sequential acoustic parameters Pi(n) (i=1, ... , I;n=1, ... , N) can be expressed by the straight line approximation as:

$$S(n) = D (Pi (n \times 1), Pi(n)) (n=1, ... , N-1) \tag{7}$$

A distance SL(n) from the first parameter Pi(1) to n-th parameter Pi(n) can be expressed as:

$$SL(n) = \sum_{n'=1}^{n-1} S(n') \qquad (8)$$

where $SL(1)=0$. Furthermore, the trajectory length $SL$ is expressed as:

$$SL = SL(N) = \sum_{n'=1}^{N-1} S(n') \qquad (9)$$

Trajectory length calculator 22 carries out the signal processings expressed by equations (7), (8), and (9) above.

The trajectory length signal indicative of the trajectory length SL produced from trajectory length calculator 22 is supplied to an interpolation distance or sampling length calculator 23 that calculates a sampling interval T of predetermined length, which is used to sample new dots along the trajectory by using straight line interpolation. In such case, if dot M is sampled, the sampling interval T is expressed as:

$$T = SL/(M-1) \qquad (10)$$

Sampling length calculator 23 carries out the signal processing as expressed in equation (10).

An interpolator 24 is supplied with the sampling interval signal indicative of the sampling interval T from sampling length calculator 23 and the time-sequential acoustic parameter Pi(n) from parameter memory 16. In interpolator 24, along the trajectory formed by the time-sequential acoustic parameter Pi(n) in its parameter space, or the trajectory formed, for example, by straight-line approximation, new dots are sampled with the sampling interval T to form the new time-sequential acoustic parameter Qi(m).

Figure 5:
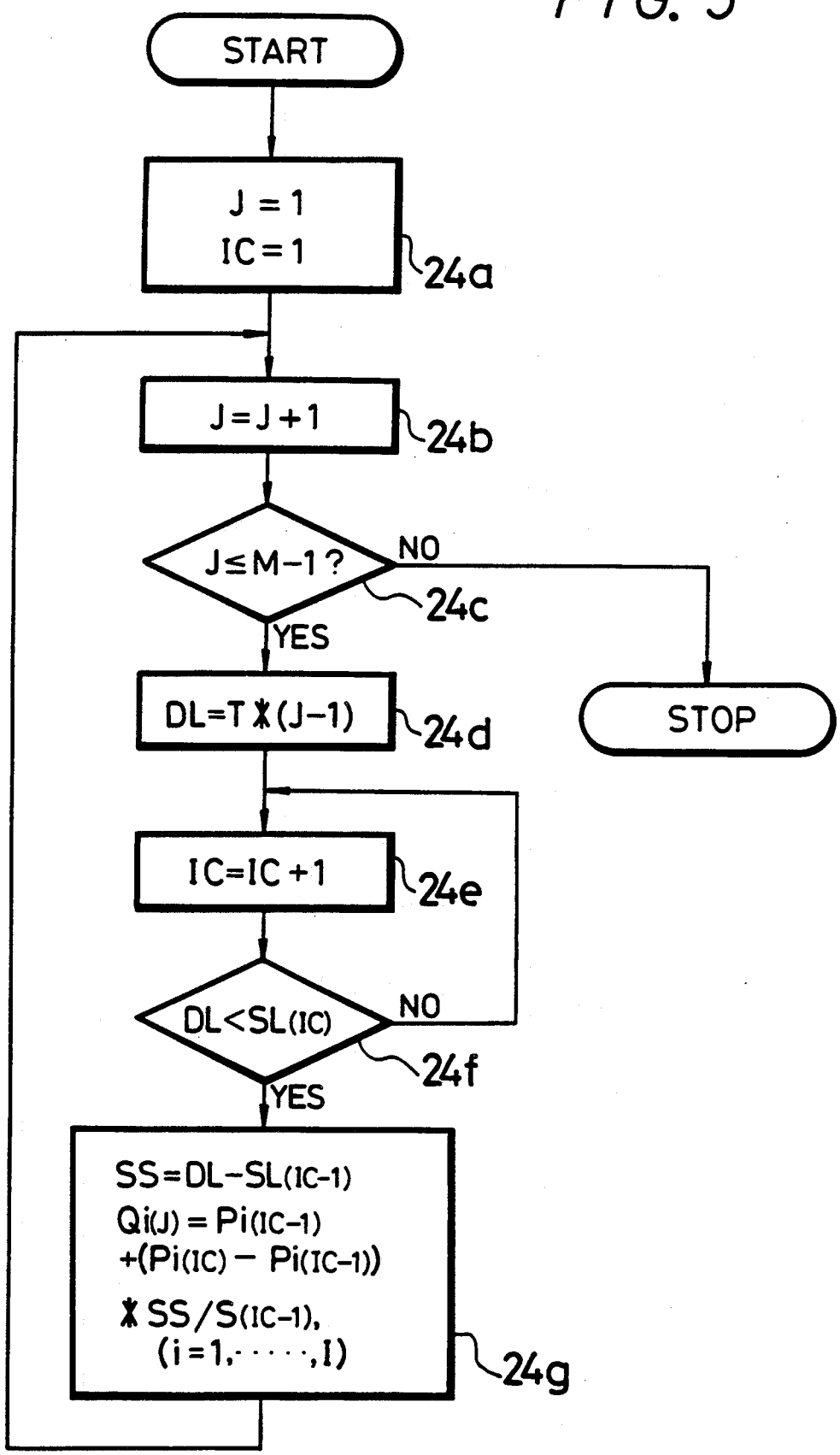
FIG. 5 is a flow chart in which the dots formed by the time-sequential acoustic parameters obtained from the segmented speech signals are interpolated by straight-line interpolation to produce a trajectory thereof.

The signal processing in interpolator 24 can more clearly be described with reference to the flow chart of FIG. 5 in which following Start in step 24a, a variable J, which indicates the sampling number, is set to "1" and a variable IC, which indicates the sampling time of the time-sequential acoustic parameter Pi(n), is also set to "1". In step 24b, the variable J is unit incremented and in step 24c, depending on whether the variable J is less than or equal to M−1 (M is the sampling number that has been previously set), it is judged whether the sampling number at that time becomes the last sampling number that must be sampled. If not, the processing proceeds to step 24d, in which a sampling distance DL from the first sampling point to the J-th sampling point is calculated, and in next step 24e the variable IC is unit incremented. Thereafter, in step 24f, depending on whether the sampling distance DL is shorter than a distance SL (IC) from the first parameter Pi(1) of the time-sequential acoustic parameter Pi(n) to the IC-th parameter Pi(IC), it is judged whether the sampling point at that time is positioned nearer the start point of the trajectory than the parameter Pi(IC) at that time. If not, in step 24e, the variable IC is unit incremented, and then in step 24f by comparing the position of the sampling point with that of the parameter Pi(IC) on the trajectory, it is judged that the sampling point is positioned nearer the start point than the parameter Pi(IC) on the trajectory. The processing proceeds to step 24g, in which by the sampling, a new time-sequential acoustic parameter Qi(J) is formed along the trajectory. In other words, initially a distance SL(IC−1) of the (IC−1)-th parameter Pi(IC−1) positioned nearer the start point than the J-th sampling point is subtracted from the sampling distance DL to obtain a distance SS from the (IC−1)-th parameter Pi(IC01) to the J-th sampling point. Then, this distance is divided by a distance S(n), which is the distance S(n) obtained by the signal processing expressed by equation (7) between the parameters Pi(IC−1) and Pi(IC) that are positioned at both sides of the J-th sampling point, SS/S(IC−1). The result of this division (SS/S(IC−1) is multiplied by a difference quantity (Pi(IC)−Pi(IC−1)) obtained by taking the difference between the parameters Pi(IC) and Pi(IC−1) that are positioned at both sides of the J-th sampling point (*SS/S(IC−1)), thereby calculating the interpolation amount from the (IC−-1)-th parameter Pi(IC−1) that is closer to the start point than the J-th sampling point on the trajectory. Then, this interpolation amount is added to the (IC−1)-th parameter Pi-(IC−1) that is closer to the start point than the J-th sampling point, to form a new time-sequential acoustic parameter Qi(J) along the trajectory.

Figure 6:
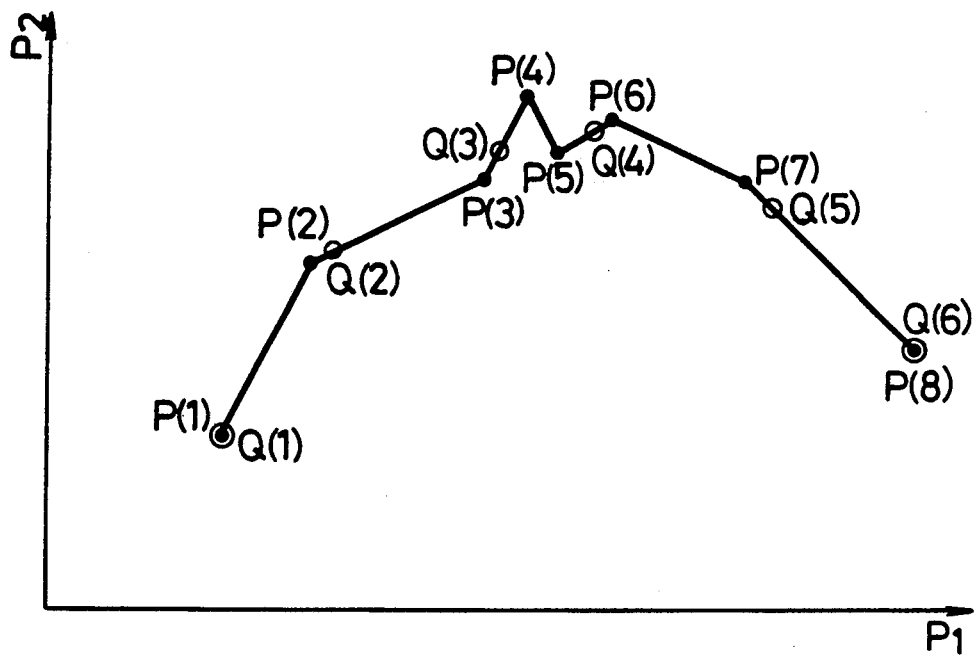
FIG. 6 is a graphical representation of the time-sequential speech recognition parameter obtained from the flow chart of FIG. 5.

FIG. 6 is a graphical representation of the two-dimensional time-sequential acoustic parameters P(1), P(2), ... P(8), the curve between the dots of the acoustic parameters is approximated by straight lines and along this trajectory, six new time-sequential acoustic parameters Q(1), Q(2), ..., Q(6) are respectively formed by straight line interpolation. In other words, when signal processing is carried out following the flow chart of FIG. 5, the new time-sequential acoustic parameter Qi(m) is formed from the time-sequential acoustic parameter Pi(n) that was obtained from the input speech signal. This new time-sequential acoustic parameter Qi(m) contains the data of the segmented input speech signals and is already time-normalized.

In discussing further the second example, it should first be noted that the sampling length set by sampling length calculator 23 in the first example is fixed at a predetermined length, regardless of the length of the trajectory formed by the segmented speech signals. By sampling the trajectory formed by the segmented speech signals with a predetermined length along the trajectory at all times, the length of the trajectory drawn by the segmented speech signals can be also used in the matching processing, so that when this trajectory is matched with the previously-registered standard trajectory, the number of previously registered standard trajectories used in the matching processing can be reduced. For example, as a substitute for step 24c in the flow chart of FIG. 5, this signal processing can be established by comparing the quantity IC with N−1, if the time-sequential acoustic parameters obtained from the segmented speech signal are taken as Pi(n) (n=1,... N).

Figure 7:
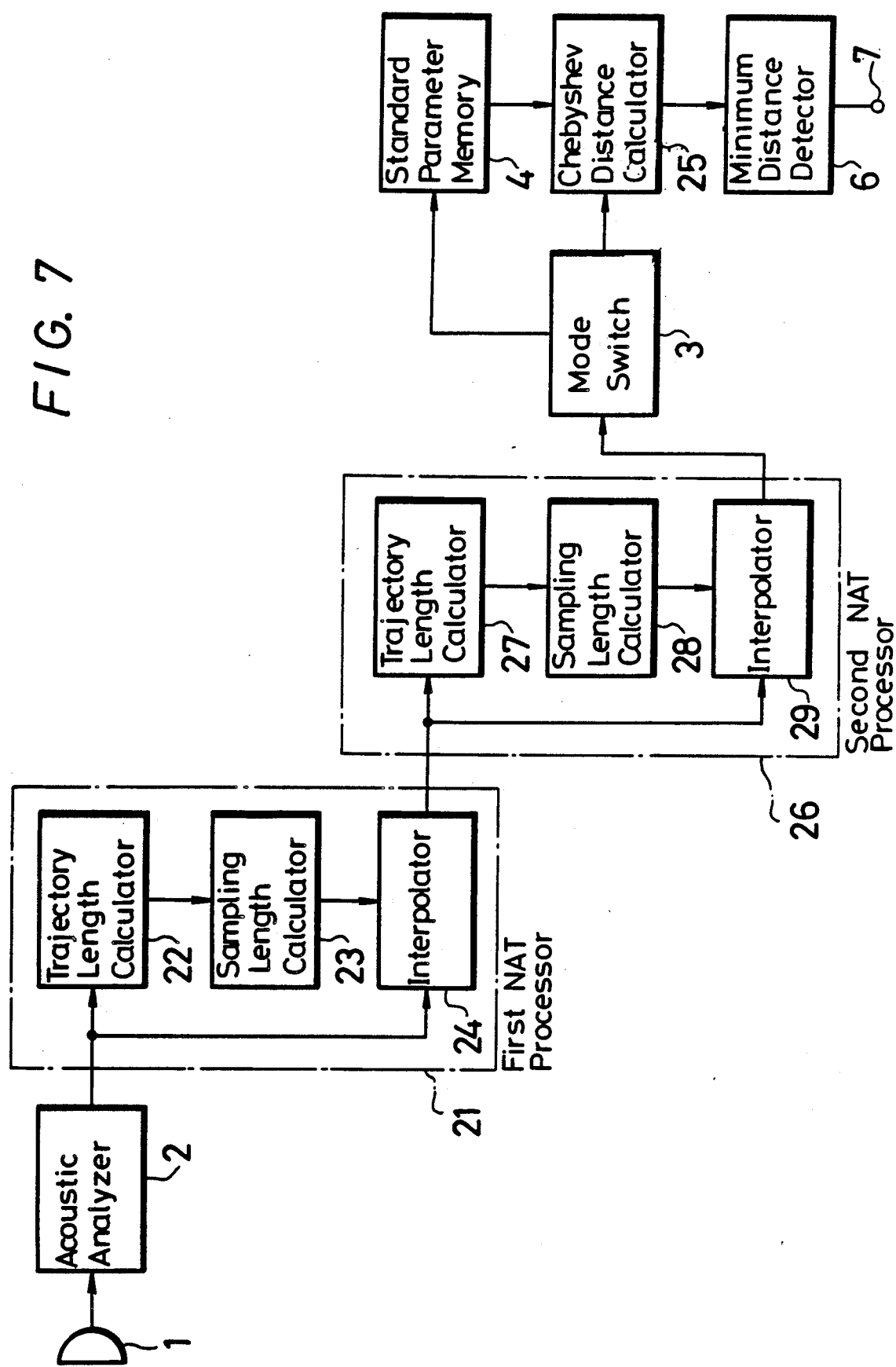
FIG. 7 is a schematic in block diagram form of another embodiment of the speech recognition apparatus according to the present invention in which normalization-along-trajectory processing is carried out twice.

FIG. 7 is another embodiment of the speech recognition apparatus, in which elements corresponding to those of FIG. 1 have the same reference numerals, and in this embodiment the time-sequential acoustic parameter derived from the acoustic analyzer 2 is supplied to NAT processor 21, in which the trajectory in the parameter space is obtained from the time-sequential acoustic parameter. Then, normalization-along-trajectory processing forming a new time-sequential acoustic parameter along the trajectory is carried out several times to perform speech recognition. This embodiment of the present invention provides the advantage that even when the speech fluctuates, it is possible to obtain a relatively high recognition ratio.

The time-sequential acoustic parameter Pi(n) from acoustic analyzer 2 is supplied to first NAT processor 21 and the new time-sequential acoustic parameter Qi(m) derived therefrom is supplied to a second NAT processor 26. In this second NAT processor 26, a trajectory in that parameter space is produced from the first new time-sequential acoustic parameter Qi(m) by, for example, straight-line approximation, and along this trajectory a second new time-sequential acoustic parameter Ri(m) is formed by straight-line interpolation, for example.

In such signal processing, the first time-sequential acoustic parameter Qi(m) produced from first NAT processor 21 is supplied to a trajectory length calculator 27 in second NAT processor 26, which is similar to trajectory length calculator 22 in first NAT processor 21, and trajectory length calculator 27 calculates the length of the trajectory drawn by the first new time-sequential acoustic parameter Qi(m) in the parameter space.

A second trajectory length signal indicative of the length produced from second trajectory length calculator 27 is fed to a second sampling length calculator 28, which is similar to first sampling length calculator 23 in first NAT processor 21. Second sampling length calculator 28 calculates the second sampling interval of the predetermined length in order to sample the new dots along the trajectory. A second interpolator 29 receives the second sampling interval signal from second sampling length calculator 28 and the first new time-sequential acoustic parameter Qi(m) produced by first NAT processor 21. Just as first interpolator 23 in first NAT processor 21, second interpolator 29 samples new dots on the trajectory drawn by the new time-sequential acoustic parameter Qi(m) in the parameter space along the trajectory obtained by straight line approximation, for example, with the second sampling interval to form the second new time-sequential acoustic parameter Ri(m) from the new dots.

In this embodiment, normalization along trajectory processing is carried out twice, however, it will be understood that if the NAT processing is carried out three or more times, the same beneficial action and effect will be obtained. The NAT processing can be carried out a plurality of times not only by first and second NAT processors 21 and 26 connected in cascade but also by a single NAT processor connected so that the output signal thereof is fedback to the input. Furthermore, if the sampling is always carried out with a predetermined length, regardless of the length of the trajectory that is drawn by the segmented speech signals, then the sampling length calculator is unnecessary. In addition and most importantly, the length of the trajectory drawn by the segmented speech signals can be used as data useful in selecting the registered standard trajectory in the matching processing.

Although in the above examples the trajectory in the parameter space is obtained from the time-sequential acoustic parameter by straight-line approximation, and the new time-sequential acoustic parameter is formed from this trajectory by straight-line interpolation, it will be easily seen that if the trajectory is obtained by circular-arc approximation, spline approximation and so on and a new time-sequential acoustic parameter is formed from this trajectory by circular-arc interpolation, spline interpolation, and so on, the same beneficial action and effect as obtained in the above-described embodiment can be achieved.

In the above embodiments, the new time-sequential acoustic parameter obtained from the NAT processor is selectively changed over by a mode switch 3, whereby upon registration mode it is stored in a standard parameter memory 4 at every segmented speech signal to be speech-recognized, whereas in the recognition mode it is supplied to a Chebyshev distance calculator 25. Other kinds of distance calculators are suitable for use in this system and the Chebyshev one is provided as a well-known example. In the recognition mode, the standard time-sequential parameter stored in standard parameter memory 4 is also supplied to Chebyshev distance calculator 25.

Chebyshev distance calculator 25 calculates the Chebyshev distance between the new time-sequential acoustic parameter with time-normalized speech and the standard time-sequential parameter stored in standard parameter memory 4. The distance signal indicative of the Chebyshev distance from Chebyshev distance calculator 25 is supplied to a minimum distance detector 6 that detects the standard time-sequential parameter in which the Chebyshev distance relative to the time-sequential acoustic parameter produced from the segmented input acoustic signals is at a minimum, the detected result then being supplied at an output terminal 7.

In the above matching of the segmented input speech signal with the previously registered speech signal, the Chebyshev distance between the segmented input acoustic signal and the previously registered speech signal is calculated by Chebyshev distance calculator 25, although any method can be adopted provided that the distance therebetween can be calculated. If the dynamic programming matching method is adopted for this distance calculation, because the segmented input speech signal is already time-normalized there are advantages that the amount of calculations is reduced and that the memory capacity necessary for processing is minimized. It is also possible to use a linear matching method and a discriminant function to accomplish this distance measurement.

In explaining the difference between the amount of calculations of the speech recognition apparatus provided by the present invention, which carries out the normalization along trajectory processing and that of the prior art speech recognition apparatus, which uses the dynamic programming matching method, it is seen that if an average calculation amount necessary for dynamic programming matching per standard pattern relative to the input pattern is taken as $\alpha$, an average calculation amount in Chebyshev distance calculator 25 is taken as $\beta$, and an average calculation amount of NAT processor 21 is taken as $\gamma$, then a calculation amount $C_1$ necessary for dynamic programming matching J standard patterns can be expressed as:

$$C_1 = \alpha \cdot J \qquad (11)$$

On the other hand, a calculation amount $C_2$ necessary for NAT-processing the J standard patterns can be expressed as:

$$C_2 = \beta \cdot J \times \gamma \qquad (12)$$

Generally, the relationship between the average calculation amount $\alpha$ and the average calculation amount $\beta$ is expressed as $\alpha >> \beta$, thus the following relationship can established.

$$J >> \frac{\gamma}{\alpha - \beta} \quad (13)$$

That is, as the number of words to be recognized increases, the relationship between the calculation amount $C_1$ and the calculation amount $C_2$ becomes $C_1 >> C_2$. As a result, according to the speech recognition apparatus of the present invention, which employs the NAT processing, there is an advantage that the calculation amount can be decreased considerably.

Figure 8:
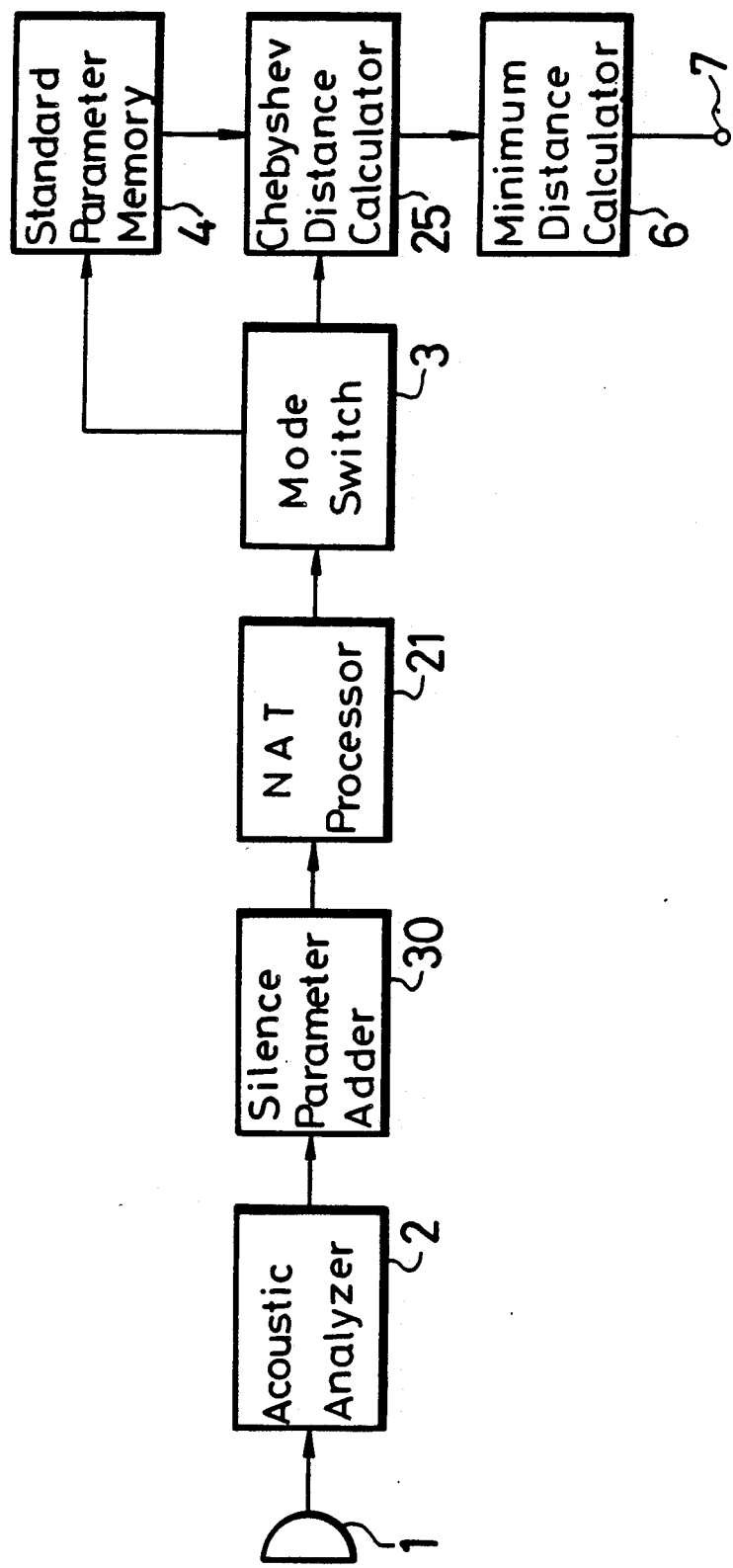
FIG. 8 is a schematic in block diagram form of still another embodiment of the speech recognition apparatus according to the present invention in which a silence parameter is added to the segmented speech signal before producing the trajectory.

FIG. 8 is an embodiment of the speech recognition apparatus according to the present invention in which added to the speech recognition apparatus of FIG. 1 is a silence parameter adder 30, which adds an acoustic parameter indicative of silence to the plurality of time-sequential acoustic parameters that are to be supplied to NAT processor 21.

Figure 9:
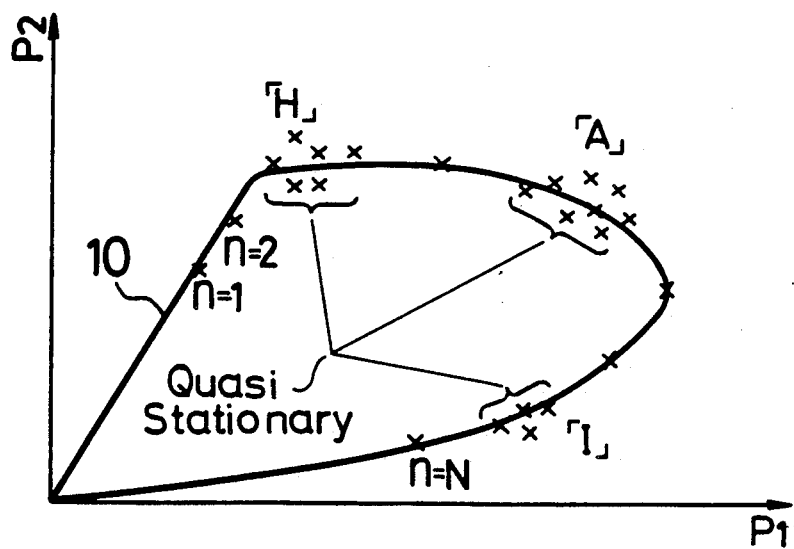
FIG. 9 is a graphical representation of a trajectory in the parameter space drawn by the segmented speech signal with a silence parameter added thereto.

FIG. 9 graphically represents a trajectory that is drawn by a plurality of time-sequential acoustic parameters to which the silence acoustic parameter, produced by silence parameter adder 30 (FIG. 8), have been added. The trajectory drawn by the segmented speech signals with the added silence acoustic parameter is illustrated in a two-dimensional parameter space for simplicity and by virtue of the trajectory drawn by the segmented speech signals with the added silence data, it is possible to remove an influence of the time displacement of the segmentation of the speech signal exerted upon the speech recognition by the segmentizer 17 (FIG. 1). NAT processor 21 calculates the time-sequential speech recognition parameter from the trajectory drawn by the segmented speech signal with the added silence signal. Although this trajectory is obtained by adding the silence acoustic parameter to both ends of the time-sequential acoustic parameter indicative of the segmented speech signal, it is possible to obtain the trajectory by adding the silence acoustic parameter only at the front portion or the rear portion of the acoustic time-sequential parameter indicative of the segmented speech signal.

Figure 10:
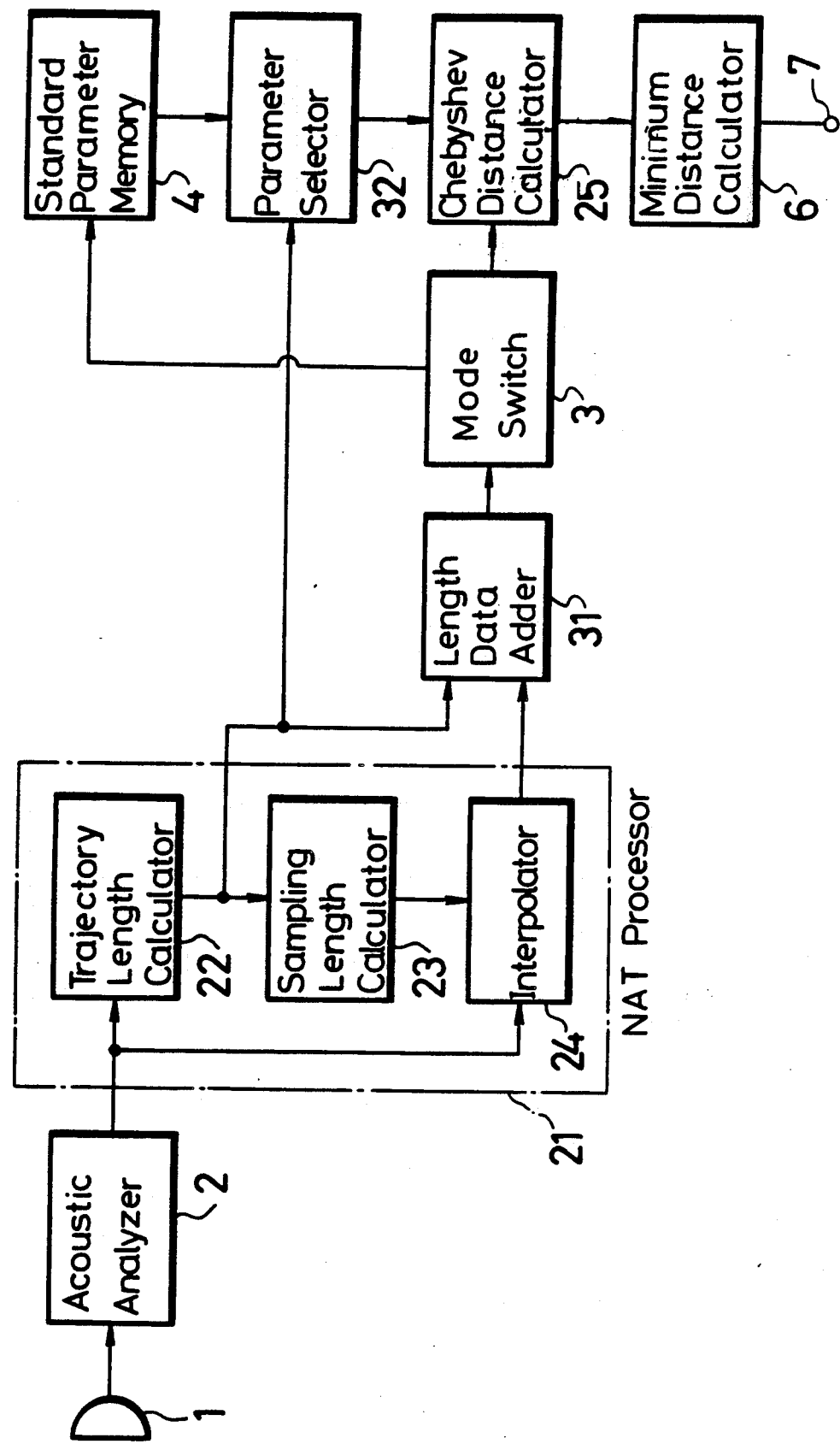
FIG. 10 is a schematic in block diagram form showing a further embodiment of the speech recognition apparatus according to the present invention.

In the embodiment of the speech recognition apparatus according to the present invention of FIG. 10, before the trajectory drawn by the time-normalized input speech signal to be speech-recognized and the previously registered standard trajectory are matched with each other using the length of the trajectory drawn by the input speech signal, a desired standard trajectory is selected from a plurality of previously registered standard trajectories, thereby decreasing the number of standard trajectories that need be used in the matching processing. This provides a corresponding reduction in calculation time.

Elements in FIG. 10 corresponding to those of FIG. 1 are identified with the same reference numerals and will not be described in detail. In FIG. 10, a length data adder 31 adds data indicative of the trajectory length of the trajectory drawn by the segmented speech signal produced from trajectory length calculator 22 to the time-sequential speech recognition parameter derived from the trajectory drawn by the segmented speech signal that is produced from NAT processor 21. The new time-sequential acoustic parameter with the added trajectory length signal produced by length data adder 31 is selectively changed over by mode switch 3 so that in the registration mode it is stored in standard parameter memory 4 at every segmented speech signal to be speech-recognized, whereas in the recognition mode it is supplied to Chebyshev distance calculator 25. In the recognition mode, the standard time-sequential parameter stored in standard parameter memory 4 is supplied to a standard parameter selector 32 that compares the trajectory length signal added to the new time-sequential speech recognition parameter produced from the present segmented input speech signal with the trajectory length signal added to every standard time-sequential parameter stored in standard parameter memory 4, whereby the compared result is used to select the standard time-sequential parameter to carry out the matching processing for the time-sequential speech recognition parameter produced from the input segmented speech signal.

The standard parameter selector 32 is described more fully as follows. Generally, it is considered that if words are the same, the time-sequential acoustic parameters of same words will draw the trajectories of nearly the same shape and length in the parameter space thereof. From this standpoint, the standard parameter selector 32 is adapted to select the standard trajectory having the trajectory length that is displaced from the trajectory length of the trajectory drawn by the input speech signal. For example, if the trajectory length of the standard trajectory is taken as TRLS and the trajectory length of the trajectory drawn by the input speech signal is taken as TRLI, a trajectory length displacement TRL between the standard trajectory length TRLS and the trajectory length TRLI of the trajectory drawn by the input speech signal, as calculated by the signal processing, can be expressed by the following equation.

$$TRL = \frac{TRLI}{TRLS} + \frac{TRLS}{TRLI} \quad (14)$$

In this case, the trajectory length displacement TRL can be calculated not only by the above-described equation but also by other suitable functions. As is seen from equation (14), when the trajectory length TRLS of the standard trajectory and the trajectory length TRLI of the trajectory drawn by the input speech signal are equal, this trajectory length displacement TRL takes a minimum value of 2. In this embodiment, any standard trajectory in which the trajectory length displacement TRL between the trajectory length TRLI drawn by the input speech signal and the trajectory length TRLS of the standard trajectory that has a value larger than 2.1 is supplied to Chebyshev distance calculator 25.

In the embodiment of FIG. 10, the speech signal applied to microphone 1 is converted to the time-sequential acoustic parameter by acoustic analyzer 2. This time-sequential acoustic parameter is then supplied to NAT processor 21 that forms the new time-sequential acoustic parameter, which is time-normalized in the parameter space, from the time-sequential acoustic parameter. In length data adder 31 the trajectory length signal indicative of the trajectory drawn by the segmented input speech signal produced from trajectory length calculator 22 of NAT processor 21 is added to the new time-sequential parameter. The combined output is supplied through mode switch 3 to standard parameter memory 4 in the registration mode, whereas in the recognition mode, it is supplied to Chebyshev distance calculator 25. Then, the trajectory length signal produced from trajectory length calculator 22 and the standard time-sequential acoustic parameter added with the trajectory length signal and stored in standard parameter memory 4 are respectively supplied to parameter selector 32. In parameter selector 32 the trajectory length displacement TRL between the trajectory length TRLI of the trajectory drawn by the segmented input speech signal and the trajectory length TRLS having the standard parameter is calculated in keeping with equation (14). Parameter selector 32 then selects the standard time-sequential acoustic parameter in which the trajectory length displacement TRL has a value not larger than, for example, 2.1 and supplies this standard time-sequential acoustic parameter to Chebyshev distance calculator 25. Chebyshev distance calculator 25 calculates the Chebyshev distance between the time-sequential speech recognition parameter obtained from the segmented input speech signal and the selected standard time-sequential parameter, and the distance signal indicative of the Chebyshev distance is supplied to and detected by minimum distance detector 6. Thus, the recognized result indicating to which particular standard time-sequential parameter the time-sequential speech recognition parameter, or particular standard trajectory drawn by the input speech signal, corresponds is delivered to output terminal 7. Because the trajectory length of the trajectory drawn by the segmented input speech signal is used as the recognition data for the matching processing, it is sufficient to match the above-described trajectory with less than all of the standard trajectories, so that the calculation amount necessary for processing in Chebyshev distance calculator 25 and minimum distance detector 6 are decreased considerably.

In FIG. 10 the time-sequential acoustic parameter produced from acoustic analyzer 2 is supplied to trajectory length calculator 22 of NAT processor 21 and the trajectory length of the trajectory drawn in the parameter space by the segmented input speech signals is calculated by trajectory length calculator 22, however, it will be easily seen that if another trajectory length calculator is provided independent of trajectory length calculator 22 and the new time-sequential acoustic parameter produced from NAT processor 21 is supplied to this other trajectory length calculator, which then calculates the trajectory length of the trajectory drawn in the parameter space by the new time-sequential acoustic parameter and the standard trajectory is selected on the basis of this calculated trajectory length, then the same beneficial effects as those of the above-described embodiment can be obtained. Further, it will easily be seen that when the normalization-along-trajectory processing is carried out several times, the above-described signal processing can be carried out.

Figure 11:
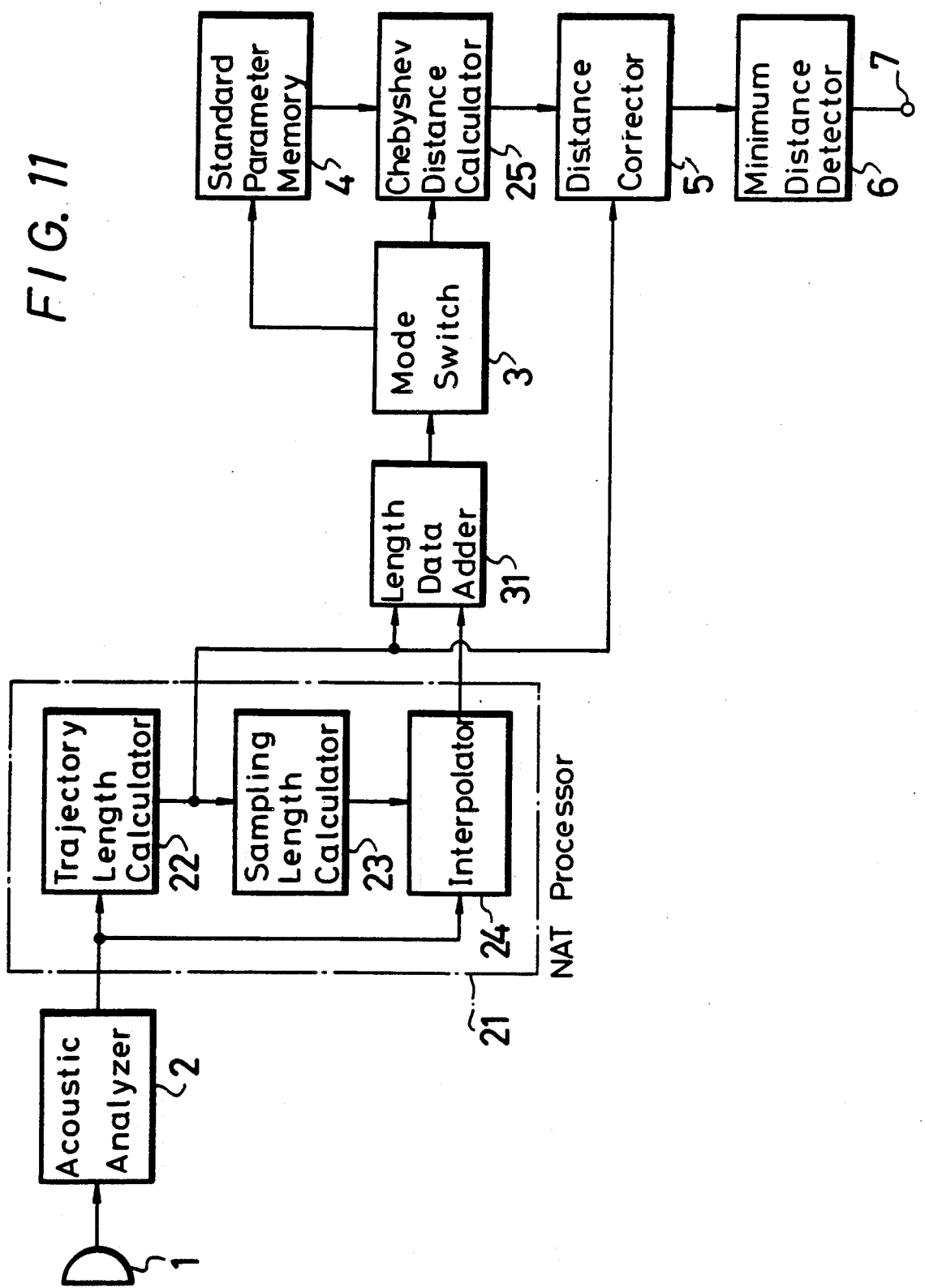
FIG. 11 is a schematic in block diagram form of yet another embodiment of the speech recognition apparatus according to the present invention.

In the embodiment of FIG. 11, when the trajectory drawn by the segmented input speech signals and the previously registered standard trajectory are matched with each other, taking both trajectory lengths into consideration, the correct standard trajectory is selected, thereby increasing the recognition ratio. In FIG. 11 elements corresponding to those of FIG. 1 have the same reference numerals and need not be described in detail. The length data adder 31 is supplied with the new time-sequential acoustic parameter produced from interpolator 24 of the NAT processor 21 and the trajectory length signal from trajectory length calculator 22 thereof. Accordingly, length data adder 31 produces the time-sequential acoustic parameter added with the trajectory length signal indicative of the trajectory length of the trajectory drawn in the parameter space by the segmented input speech signals. The new time-sequential acoustic parameter added with the trajectory length signal produced from length data adder 31 is selectively changed over by mode switch 3, whereby in the registration mode it is stored in standard parameter memory 4 at every segmented input speech signal to be recognized, whereas in the recognition mode, it is supplied to Chebyshev distance calculator 25. In the recognition mode the standard time-sequential parameter stored in standard parameter memory 4 is supplied to Chebyshev distance calculator 25 that calculates the distance signal indicative of the Chebyshev distance between the time-sequential speech recognition parameter produced from segmented input acoustic signal and the standard time-sequential parameter and produces the distance signal and the signal indicative of the trajectory length of this standard trajectory. The distance signal and the signal indicative of the trajectory length of the standard trajectory produced from Chebyshev distance calculator 25 are supplied to a distance corrector 5 that also receives the signal indicative of the trajectory length from trajectory length calculator 22 of NAT processor 21.

Distance corrector 5 operates to compare the trajectory length of the trajectory drawn by the segmented input speech signal and the trajectory length of the standard trajectory with each other and corrects the Chebyshev distance produced from Chebyshev distance calculator 25 based on such comparison.

In describing distance corrector 5 more fully it is seen that, generally, if the spoken words are same, the time-sequential acoustic parameters of the same words draw trajectories of substantially the same shape and length in the parameter space thereof. Accordingly, in view of this, distance corrector 5 corrects the distance (the Chebyshev distance in this embodiment but a distance obtained by some other calculation method could also be adopted) between the trajectory by the segmented input speech signal and the standard trajectory in accordance with the trajectory length displacement between the trajectory drawn by the segmented input speech signal and the standard trajectory. In other words, if the trajectory length of the standard trajectory is taken as TRLS, and the trajectory length of the trajectory drawn by the segmented input speech signal is taken as TRLI, the trajectory length displacement TRL calculated by the signal processing can be expressed by the following equation.

$$TRL = \frac{TRLI}{TRLS} + \frac{TRLS}{TRLI} \qquad (15)$$

In this case, as will be clear from equation (15) that when TRLS=TRLI is established, the trajectory length displacement TRL has a minimum value of 2. If the distance signal is taken as Chbs, as derived from the trajectory length displacement TRL, distance signal Chbs can be distance corrected by suitable signal processing expressed by:

$$CHBS = Chbs \cdot (TRL)^1 (a > 0) \qquad (16)$$

Thus, a corrected distance signal CHBS is obtained. In this embodiment, a can have a value of, for example, 2.

The corrected distance signal CHBS from distance corrector 5 is then supplied to minimum distance detector 6, and the other circuits, such as acoustic analyzer 2, are similar to those of the speech recognition apparatus of FIG. 1.

Although illustrative embodiments of the invention have been described in detail herein with reference to the accompanying drawings, it is to be understood that the invention is not limited to those precise embodiments, and that many modifications and variations could be effected by one skilled in the art without departing from the spirit and scope of the invention, as defined in the appended claims.

What is claimed is:

1. A method of speech recognition comprising the steps of:

segmenting an input speech signal;

deriving a plurality of time-sequential acoustic parameters from the segmented speech signal having characteristics time-normalized at every segment;

forming a first trajectory using a plurality of dots, each dot corresponding to one of said plurality of time-sequential, time-normalized acoustic parameters, to form a time-normalized trajectory of said segmented speech signal;

providing a plurality of registered trajectories representing known speech segments, each of said registered trajectories being represented by a plurality of data;

matching a formed trajectory with one of said registered trajectories; and producing an indication of the results of the matching; and characterized by the further steps of:

sampling said formed first trajectory at a predetermined length therealong, thereby producing new data representing said formed trajectory to be matched with said registered trajectories;

determining a length of said formed trajectory;

determining lengths of said registered trajectories;

comparing the length of said formed trajectory with the registered trajectory lengths; and using the comparison results in said step of matching.

2. A method of speech recognition according to claim 1, in which said new time-normalized trajectory is formed on the basis of more than two adjacent time-sequential dots of said new dots.

3. A method of speech recognition according to claim 2, in which said new time-normalized trajectory is formed to pass through each dot in excess of two of said new dots.

4. A method of speech recognition according to claim 3, in which said new time-normalized trajectory is formed by interpolating a distance between said new dots by straight-line interpolation.

5. A method of speech recognition according to claim 3, in which said new time-normalized trajectory is formed by interpolating a distance between said new dots by curved-line interpolation.

6. A method of speech recognition according to claim 1, in which said step of forming a first trajectory includes the step of adding a silence acoustic parameter to said plurality of time-sequential acoustic parameters derived from said segmented speech signal.

7. A method of speech recognition according to claim 6, in which said step of forming a first trajectory includes the step of beginning said first trajectory at a point indicative of silence.

8. A method of speech recognition according to claim 6, in which said step of forming a first trajectory includes the steps of beginning said first trajectory at a point indicative of silence, and ending said first trajectory at said point indicative of silence.

9. A method of speech recognition according to claim 6, in which said step of forming a first trajectory includes the step of ending said first trajectory at a point indicative of silence.

10. A method of speech recognition according to claim 1, in which said predetermined lengths used for sampling said trajectory are varied in accordance with a total length of said first trajectory formed using said segmented speech signal.

11. A method of speech recognition according to claim 1, further comprising the step of comparing a trajectory length of said new time-normalized trajectory formed by said segmented speech signal with a trajectory length of said registered trajectory before carrying out the step of matching, thereby to decrease the number of said registered trajectories to be matched with said new time-normalized trajectory.

12. A method of speech recognition according to claim 1, further comprising the steps of determining a length of said new time-normalized trajectory formed from said segmented speech signal, determining the lengths of said registered trajectories, comparing the length of the new time-normalized trajectory with the registered trajectory length and using the comparison results in the matching step.

13. Apparatus for speech recognition, comprising:

means for segmenting an input speech signal;

means for producing a plurality of time-sequential acoustic parameters from the segmented speech signal, said parameters lying along a trajectory;

means for producing a plurality of speech recognition parameters from said plurality of time-sequential acoustic parameters;

means for registering a plurality of speech recognition parameters having respective known speech segment correlations;

means for matching said calculated time-sequential speech recognition parameters with previously registered speech recognition parameters;

output means for producing an output representing the results of the matching processing in said means for matching, wherein said means for producing a plurality of speech recognition parameters comprises:

first calculating means receiving said time-sequential acoustic parameter produced at a first sample time and respective acoustic parameters produced at adjacent sampling times;

second calculating means receiving said calculated intervals for calculating said speech recognition parameters by sampling at a series of said calculated intervals for a predetermined length over the trajectory; and further comprising:

means for correcting a matching distance between said time-sequential speech recognition parameter produced from said segmented speech signal and said previously registered speech recognition parameter during operation of said means for matching based on the difference between a series of intervals of said plurality of time-sequential acoustic parameters produced from said segmented speech signal and a series of intervals of said previously registered speech recognition parameters during operation of said means for matching.

14. Apparatus according to claim 13, in which said first calculating means includes third calculating means for calculating the interval between said adjacent acoustic parameters at each of a plurality of time-sequential acoustic parameters and for calculating a distance between a parameter at a selected time and a parameter at an adjacent time by summing all of said calculated intervals.

15. Apparatus according to claim 14, in which said third calculating means comprises curved-line interpolation means for calculating the distance between said adjacent acoustic parameters.

16. Apparatus according to claim 13, further comprising means for adding to said plurality of time-sequential acoustic parameters an acoustic parameter indicative of silence.

17. Apparatus according to claim 16, in which said means for adding said silence acoustic parameter includes means for arranging said silence acoustic parameter at a start point of each of said plurality of time-sequential acoustic parameters produced from said segmented speech signal.

18. Apparatus according to claim 16, in which said means for adding said silence acoustic parameter includes means for arranging said silence acoustic parameter at an end point of each of said plurality of time-sequential acoustic parameters produced from said segmented speech signal.

19. Apparatus according to claim 16, in which said means for adding said silence acoustic parameter includes means for arranging said silence parameter at both start and end points of each of said plurality of time-sequential acoustic parameters produced from said segmented speech signal.

20. Apparatus according to claim 13, in which said time-sequential speech recognition parameters lie along a second trajectory and said second calculating means includes means for sampling said second trajectory at a series of intervals therealong for producing further time-sequential speech recognition parameters.

21. Apparatus according to claim 13, further comprising means for selecting a previously registered time-sequential parameter for use in said means for matching on the basis of a length formed of a series intervals of said plurality of time-sequential acoustic parameters produced from said segmented speech signal.

22. Apparatus according to claim 14, in which said third calculating means comprises straight-line interpolation means for calculating the interval between said adjacent acoustic parameters.

* * * * *

UNITED STATES PATENT AND TRADEMARK OFFICE
CERTIFICATE OF CORRECTION

PATENT NO. : 5,003,601

DATED : March 26, 1991

INVENTOR(S) : Masao Watari, Yoichiro Sako, Makoto Akabane, Atsunobu Hiraiwa

It is certified that error appears in the above-identified patent and that said Letters Patent is hereby corrected as shown below:

In the Abstract, line 9, after "spaced" insert --data--

Col. 4, line 22, change "i x b" to --i + b-- line 40, change "i x b" to --i + b--

Col. 5, line 60, change "Pi" to --$\hat{P}i$--;

line 61, change "Pi" first and third occurrence to --$\hat{P}i$--,

Col. 6, line 14, change "/" second occurrence to --.-- line 65, change "(n x 1)" to --(n + 1)--

Col. 8, line 14, change "(IC- -1)" to --(IC-1)--

Col. 10, line 57, change "$C_1$-$\alpha$ J" to --$C_1$=$\alpha$·J-- line 63, change "$C_2$-" to --$C_2$=-- same line, change "J x $\gamma$" to --J + $\gamma$--

UNITED STATES PATENT AND TRADEMARK OFFICE
CERTIFICATE OF CORRECTION

PATENT NO. : 5,003,601
DATED : March 26, 1991
INVENTOR(S) : Masao Watari, Yoichiro Sako, Makoto Akabane, Atsunobu Hiraiwa It is certified that error appears in the above-identified patent and that said Letters Patent is hereby corrected as shown below:

Col. 12, line 18, before "same" insert --the--
  same line, after "draw" delete "the"

Col. 14, line 13, after "from" insert --the--
  line 60, change "$(TRL)^1$" to --$(TRL)^a$--

Col. 16, line 46, after "acoustic" insert --parameters for calculating intervals between an acoustic--

Signed and Sealed this

Ninth Day of February, 1993

Attest:

STEPHEN G. KUNIN

Attesting Officer

Acting Commissioner of Patents and Trademarks